United States Patent
Grund et al.

(10) Patent No.: US 12,306,829 B2
(45) Date of Patent: May 20, 2025

(54) EXECUTION AND ATTESTATION OF USER DEFINED FUNCTIONS IN DATABASES

(71) Applicant: Databricks, Inc., San Francisco, CA (US)

(72) Inventors: Martin Grund, San Francisco, CA (US); Herman Rudolf Petrus Catharina van Hövell tot Westerflier, San Francisco, CA (US); Stefania Leone, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 115 days.

(21) Appl. No.: 18/161,475

(22) Filed: Jan. 30, 2023

(65) Prior Publication Data

US 2024/0256531 A1 Aug. 1, 2024

(51) Int. Cl.
*G06F 16/242* (2019.01)
*G06F 16/22* (2019.01)
*G06F 21/60* (2013.01)

(52) U.S. Cl.
CPC ...... *G06F 16/2448* (2019.01); *G06F 16/2255* (2019.01); *G06F 16/2291* (2019.01); *G06F 21/602* (2013.01)

(58) Field of Classification Search
CPC ............. G06F 16/2448; G06F 16/2255; G06F 16/2291; G06F 21/602
See application file for complete search history.

(56) References Cited

U.S. PATENT DOCUMENTS

| | | | |
|---|---|---|---|
| 2016/0267293 A1* | 9/2016 | Subbiah | G06F 16/24534 |
| 2021/0157906 A1* | 5/2021 | Shaon | G06F 21/54 |
| 2022/0019480 A1* | 1/2022 | Hankinson | G06F 21/6245 |
| 2022/0391357 A1* | 12/2022 | Brossard | G06F 16/13 |

OTHER PUBLICATIONS

Databricks, "User-Defined Scalar Functions—Python," databricks.com, Jan. 10, 2023, 4 pages, Retrieved from the internet <URL:https://docs.databricks.com/udf/python.html>.
Databricks, "What are User-Defined Functions (UDFs)," databricks.com, Jun. 1, 2023, 5 pages, Retrieved from the internet <URL:https://docs.databricks.com/udf/index.html>.
Perrin, T. "Handshake Patterns," The Noise Protocol Framework, No. 34, Jul. 11, 2018, 15 pages, Retrieved from the internet <URL:https://noiseprotocol.org/noise.html#handshake-patterns>.

* cited by examiner

*Primary Examiner* — Khanh B Pham
*Assistant Examiner* — Ranjit P Doraiswamy
(74) *Attorney, Agent, or Firm* — Fenwick & West LLP (57) ABSTRACT

A system executes user defined functions (UDFs) invoked by database queries. The UDF includes UDF code specified using a programing language distinct from a database query language. A hash value from the UDF code provided by a client application for creating the UDF is compared with a hash value generated from UDF code invoked by database queries to determine whether the two UDF codes match. If the two hash values fail to match, the system takes an action, for example, storing an indication of UDF code mismatch or disabling subsequent executions of the database queries invoking the UDF. The system may use encoded UDF code that is decoded by the system at runtime using a key obtained from a separate system such as the client application. The client application can disable execution of database queries executing the UDF code by refusing to provide the key.

20 Claims, 10 Drawing Sheets

FIG. 10

EXECUTION AND ATTESTATION OF USER DEFINED FUNCTIONS IN DATABASES

FIELD OF ART

This invention relates generally to databases, and more particularly to execution and attestation of code included in user defined functions invoked via database queries.

BACKGROUND

Databases support database query languages such as the structured query language (SQL) for allowing applications to interact with the database system. Database query languages typically support a limited set of features and a specific syntax. Users may be interested in features that are not supported by the database query language. Database systems allow users to extend the functionality of the database query language by adding user defined functions (UDFs) that are defined using languages other than the database query language supported by the database system. For example, a database may support SQL and allow users to define UDFs using other languages such as JAVA, C, PYTHON, and so on. Once a UDF is created in a database system, the UDF may be invoked using the database query language similar to intrinsic functions of the database query language. For example, a UDF may be invoked via a SELECT statement of SQL that accesses data stored in tables of a database. In certain environments, for example, cloud platforms, the UDF code may be provided by a client application in a trusted domain but executed by another system that is outside the trusted domain. Therefore, users would like to know whether the UDF code being invoked as a UDF via database queries has been tampered with. Similarly, if multiple versions of a UDF have been created, users may not be sure if the version of the UDF being invoked by a particular database query corresponds to the version they intended to execute.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

Some database systems allow users to specify user-defined functions (UDFs) that can be invoked using database queries. The database queries may be specified using a database query language such as the structured query language (SQL) but are not limited to SQL. A UDF may include code (e.g., UDF code) provided using a programming language distinct from the database query language. For example, the UDF code may be specified in PYTHON, JAVA, C or any programming language.

Database systems allow users to specify and invoke UDFs using a client application that sends requests (e.g., queries) to the database system. In some cases, the client application may execute in a security domain associated with the user that is different from a security domain in which the database system executes the database queries. For example, in a SaaS environment, a service provider of a database system may execute queries on behalf of the user within a computing environment and security domain managed by the service provider. Computing systems running within a security domain have a trust relationship and accordingly may define any security protocols for interacting with each other. These computing systems, however may not trust computing systems outside of their security domain, such as in the previously described SaaS environment.

When a user is running a database query in a computing system within its security domain, the user has control of and visibility into the computing systems executing the database queries. Accordingly, the user can determine whether the UDF code that is being executed by the database query has been tampered with. However, if the computing system running the database queries is in a security domain outside the security domain of the user, the user does not have control of the computing systems and therefore cannot control security of the UDF code. Accordingly, the user cannot ensure that the UDF code is not accessed or tampered with by others, or verify that the UDF code that is being executed is the same as the UDF code that was specified by the user.

To alleviate this issue, a data processing service provides for code signing and attestation of UDF code that allows users to verify that the UDF code being executed matches the UDF code submitted by the user as well as control access to the UDF code. For example, a client application may sign the UDF code locally in a tamper-proof manner and the data processing service validates the signature used to sign the UDF code. This allows users to verify that the UDF code that is invoked while executing database queries matches the UDF code that was specified by the user while creating the UDF, thereby ensuring that the UDF code has not been tampered with. Similarly, if there are multiple versions of the UDF code, the data processing service allows users to confirm that the right version of UDF code is being used when executing database queries.

System Environment

Figure 1:
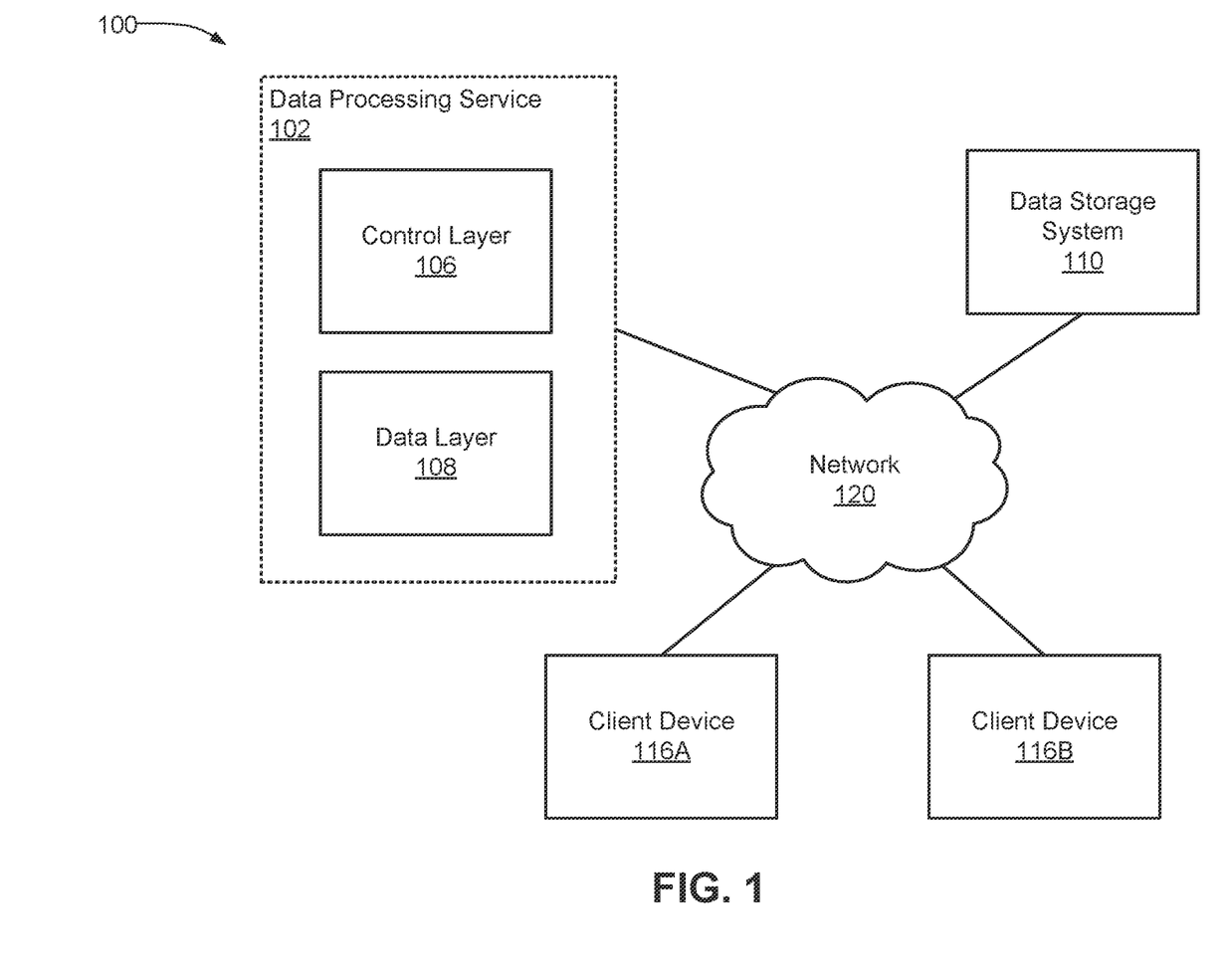
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services (e.g., database services) to users of client devices 116. The data processing service 102 may manage one or more applications that users of client devices 116 can use to communicate with the data processing service 102. The data processing service 102 may receive requests (e.g., database queries) from users of client devices 116 to perform one or more data processing functionalities on data stored by the data storage system 110. The requests may include query requests, analytics requests, or machine learning and artificial intelligence requests, and the like, in relation to data stored in the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests from client devices 116 and coordinates with the data layer 108 to process the requests. The control layer 106 may schedule one or more jobs for a request or receive requests to execute one or more jobs from the user directly through a respective client device 116. The control layer 106 may distribute the jobs to components of the data layer 108 where the jobs are executed.

Figure 5:
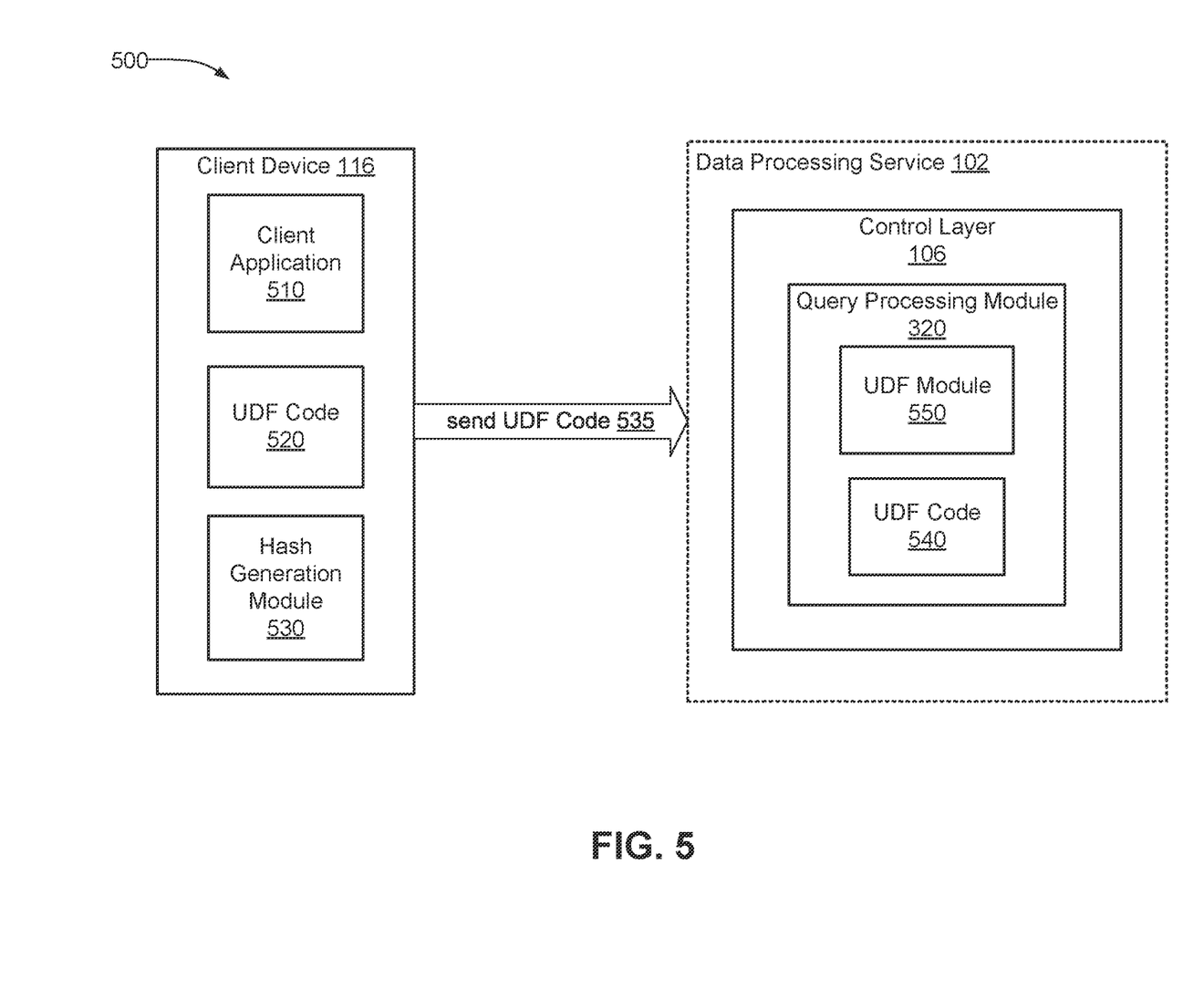
FIG. 5 illustrates a system environment for creating and invoking UDFs according to an embodiment.

The control layer 106 is additionally capable of configuring the clusters in the data layer 108 that are used for executing the jobs. The control layer includes a query processing system as illustrated in FIG. 5 and described in relation to FIG. 5. For example, a user of a client device 116 may submit a request to the control layer 106 to perform one or more queries and may specify the number of clusters (e.g., four clusters) on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. Accordingly, a single instance of the software and its supporting infrastructure serves multiple customers, each customer associated with multiple users that may access the multi-tenant system. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes (e.g., executor nodes shown in FIG. 4) that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data storage system 110 may be managed by the same entity that manages the data processing service 102.

The client devices 116 are computing devices that display information to users and communicate user actions to the systems of the system environment 100. While two client devices 116A, 116B are illustrated in FIG. 1, in practice any number of client devices 116 may communicate with the systems of the system environment 100 (e.g., data processing service 102 and/or data storage system 110). In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate with the various systems of the system environment 100 via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™.

Figure 2:
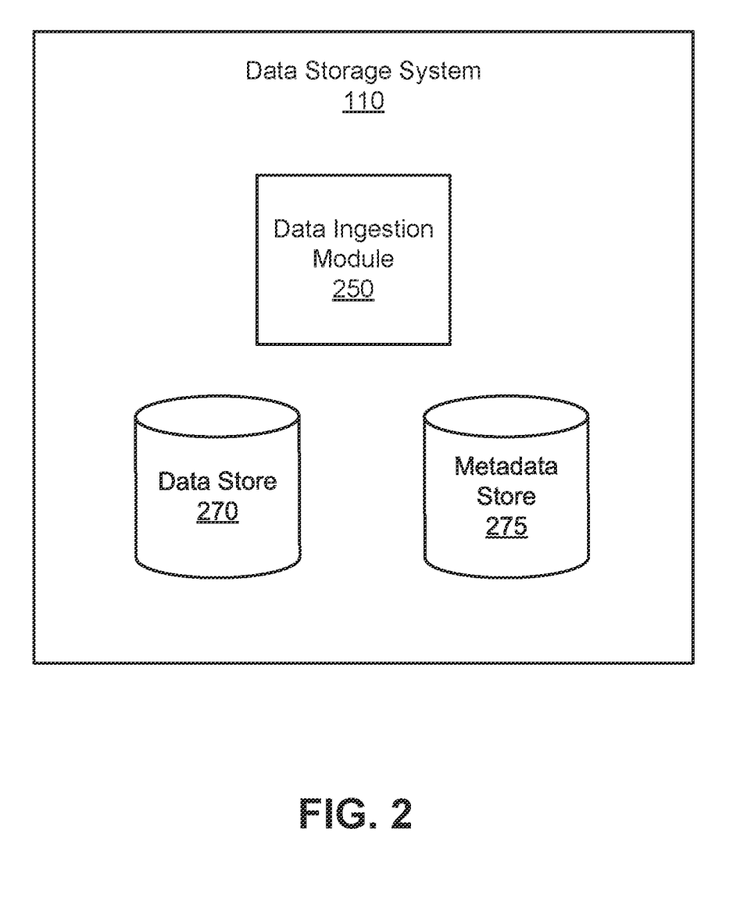
FIG. 2 is a block diagram of an architecture of a data storage system, in accordance with an embodiment.

FIG. 2 is a block diagram of an architecture of a data storage system 110, in accordance with an embodiment. In one embodiment, the data storage system 110 includes a data ingestion module 250. The data storage system 110 also includes a data store 270 and a metadata store 275.

The data store 270 stores data associated with different tenants of the data processing service 102. In one embodiment, the data in the data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records, each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

Figure 3:
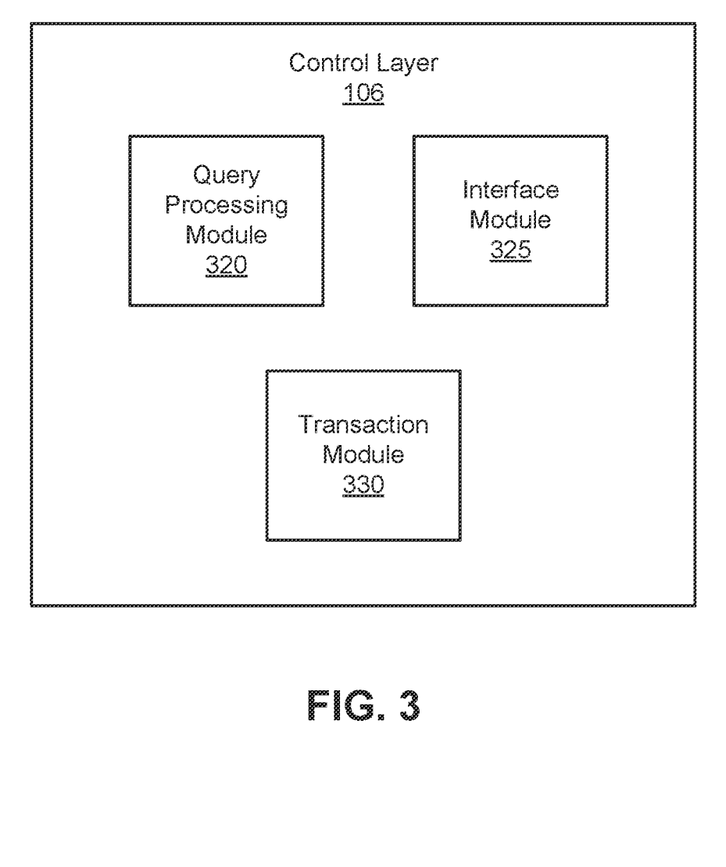
FIG. 3 is a block diagram of an architecture of a control layer, in accordance with an embodiment.

FIG. 3 is a block diagram of an architecture of a control layer 106, in accordance with an embodiment. As shown, the data processing service 102 includes an interface module 325, a transaction module 330, and a query processing module 320.

The interface module 325 provides an interface and/or a workspace environment where users of client devices 116 (e.g., users associated with tenants) can access resources of the data processing service 102. For example, the user may retrieve information from data tables associated with a tenant and submit data processing requests such as query requests on the data tables, through the interface provided by the interface module 325. The interface provided by the interface module 325 may include notebooks, libraries, experiments, queries submitted by the user, and the like. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table, and the like. As another example, the transaction may be to rearrange or reorganize the records or the data files of a data table to, for example, to improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 320 receives and processes queries that access data stored in the data storage system 110. The queries processed by the query processing module 320 may be referred to herein as database queries. A database query may invoke a UDF for processing data input to the database query. For example, the UDF may represent a function that is invoked on each record processed by a database query.

Figure 4:
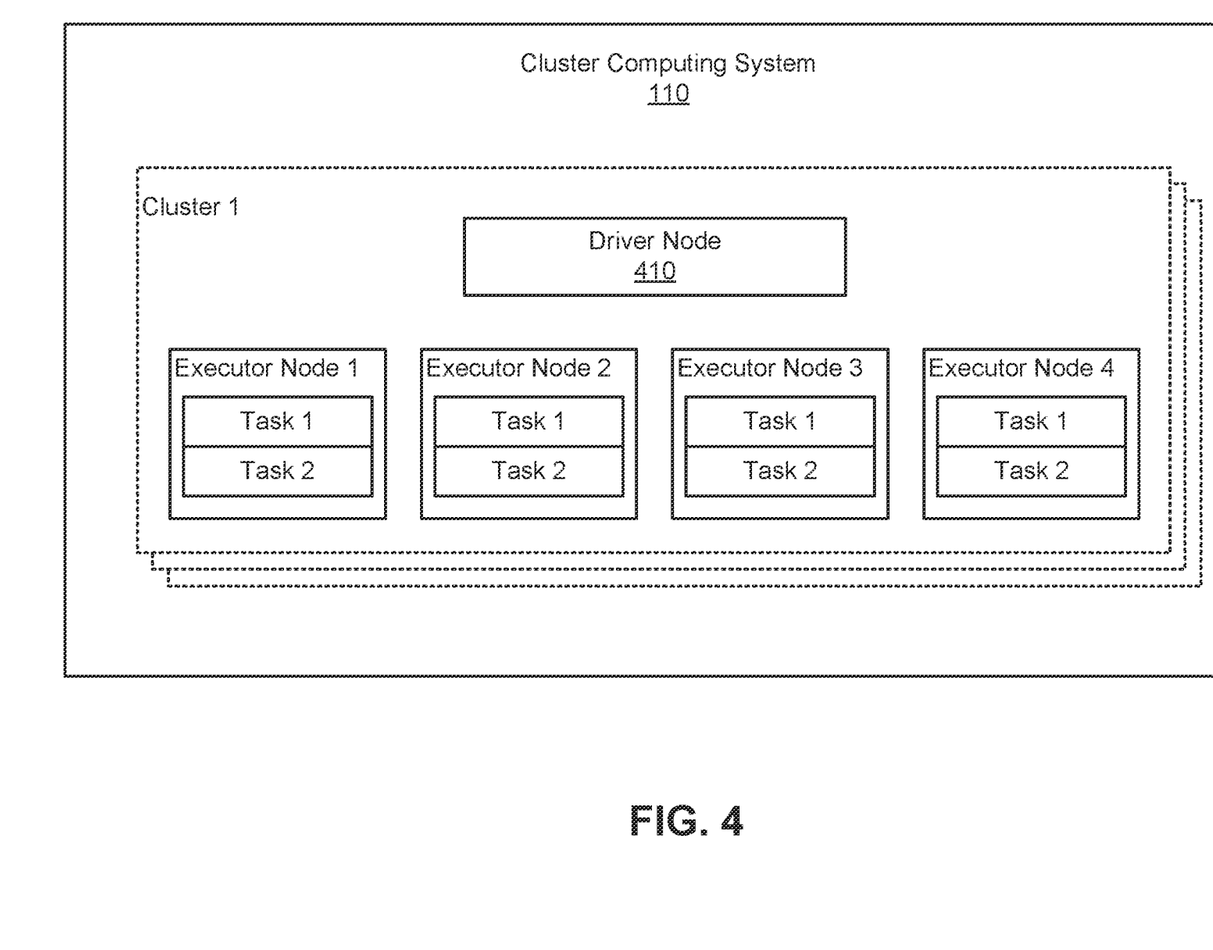
FIG. 4 is a block diagram of an architecture of a data storage system, in accordance with an embodiment.

FIG. 4 is a block diagram of an architecture of a cluster computing system 402 of the data layer 108, in accordance with an embodiment. In some embodiments, the cluster computing system 402 includes one or more computing clusters (e.g., cluster 1) that each include a driver node 410 and a worker pool of multiple executor nodes. The driver node 410 receives one or more jobs for execution, divides a job into job stages, and provides job stages to executor nodes, receives job stage results from the executor nodes of the worker pool, and assembles job stage results into complete job results, and the like.

The worker pool can include any appropriate number of executor nodes (e.g., 4 executor nodes, 12 executor nodes, 253 executor nodes, and the like). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the database query for a particular subset of data that is processed by the database query.

UDF Creation and Execution

FIG. 5 illustrates a system environment for creating and invoking UDFs according to an embodiment. The system environment 500 includes a client device 116 and a data processing service 102. Other embodiments may include more or fewer components, for example, there may be multiple client devices 116 that interact with the data processing service 102. The client device 116 executes a client application 510 that interacts with the data processing service 102. The client application 510 may send various requests to the data processing service 102, for example, database commands to create or modify database objects. The client device 116 includes the UDF code 520 that is sent to the data processing service 102 for creating a UDF that can be invoked by database queries.

The client application 510 may sends requests to the data processing service 102 to create UDFs that can be invoked in subsequent database queries. For example, a user may use the client application 510 to submit UDF code defining operation of the UDF. The client application 510 serializes the UDF code and sends the serialized UDF code 535 to the data processing service 102. Serialization of the UDF code comprises converting the UDF code to a stream of bytes that can be used for storing the UDF code or for transmitting the UDF code via a network. The stream of bytes generated from the UDF code can be converted back to the UDF code, for example, by the data processing service 102 that receives the serialized UDF code from a client application. The process of converting the byte code to the UDF code is referred to as deserialization.

According to an embodiment, the client application 510 includes a hash generation module 530 that generates a cryptographic hash value based on the UDF code and stores it. The hash value generated by the client application can be compared with a hash value generated by the data processing service 102 during execution of a database query that invokes the UDF code for verifying that the UDF code that was transmitted by the client application matches the UDF code invoked by the data processing service 102 during execution of a database query that invokes the UDF code. According to an embodiment, the client application encodes the UDF code and send the encoded UDF code to the data processing service 102. The data processing service 102 decodes the encoded UDF code before executing the UDF code, for example, while executing a database query that invokes the UDF code. The hash generation module 530 may be part of the client application 510.

The data processing service 102 includes the control layer 106 that includes a query processing module 320. The query processing module 320 includes a UDF module 550 and the UDF code 540 received from the client application 510. The UDF module 550 handles various tasks associated with UDFs, for example creating a UDF, invoking the UDF, and the like. According to an embodiment, the UDF module 550 receives the UDF code from the client application 510 and stores the UDF code 540 for invocation by database queries. The details of the UDF module 550 are illustrated in FIG. 6 and explained in connection with FIG. 6.

Figure 6:
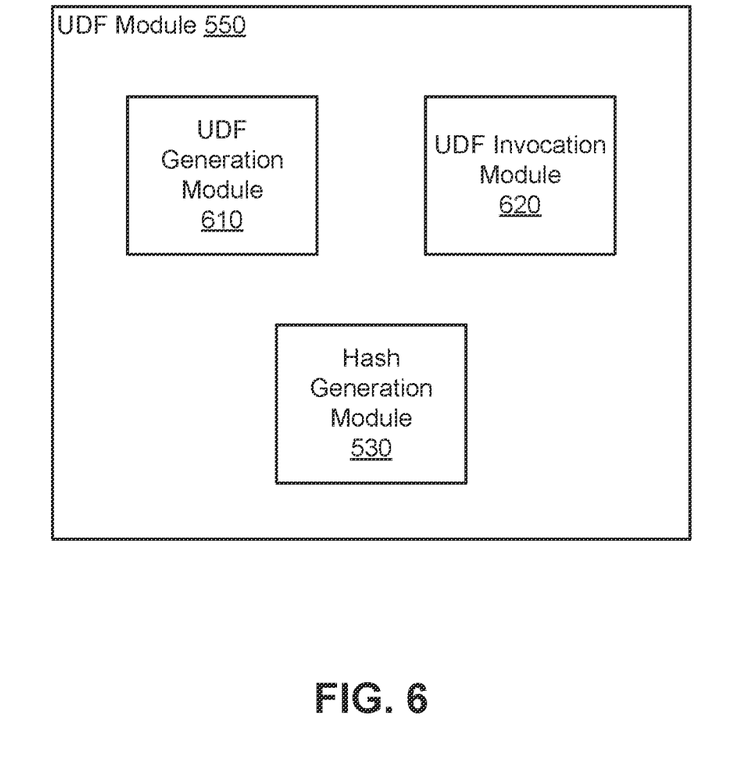
FIG. 6 illustrates a system architecture of a UDF module according to an embodiment.

FIG. 6 illustrates a system architecture of a UDF module 550 according to an embodiment. The UDF module 550 comprises a UDF generation module 610, a UDF invocation module 620, and a hash generation module 530. Other embodiments may include more or fewer modules.

The UDF generation module 610 processes database commands for creating UDFs. The UDF generation module 610 parses the command to extract various attributes associated with a UDF, for example, the UDF name, input parameters, return type, UDF code, and so on. The UDF generation module 610 stores the attributes describing the UDF as metadata, for example, in a catalog table.

As discussed, one of the requests that the client application 510 can send to the data processing service 102 comprises a database command to create a UDF. The following is an example database command for creating a UDF.

```
CREATE OR REPLACE FUNCTION foo1(param1 STRING)
RETURNS INT
LANGUAGE PYTHON
AS $$
// UDF CODE
$$;
```

In the above example, the database command to create a UDF specifies a name for the UDF, for example, foo1; one or more parameters for the UDF and the type of each parameter, for example, parameter param1 of type STRING; a return type of the UDF, for example, return type INT; a language of the UDF code, for example, PYTHON; and the UDF code 520 comprising a set of instructions specified in the language of the UDF.

The UDF invocation module 620 executes UDFs. The UDF invocation module 620 may execute the UDF code when the query processing module 320 processes database queries that call the UDF. The UDF code may be specified using a programming language such as PYTHON or JAVASCRIPT that is interpreted. As a result, the UDF code as specified by the create command for a UDF is executed without any modification by the UDF invocation module 620. The UDF code may be specified using a programming language that is compiled, for example, C, C++, JAVA. Accordingly, the client application 510 may receive the UDF code as source code in the programming language and compile the source code to generate executable code. The client application 510 may send a command to create the UDF specifying the executable UDF code that is obtained by compiling the UDF source code. The UDF creation command may specify the executable code as binary data, for example, using a BLOB (binary large object). Accordingly, the UDF code that is specified using a UDF creation command is executed, for example, by an executor node without any further transformation.

The hash generation module 530 generates a hash value based on the UDF code. The hash generation module 530 applies a hash function to the UDF code, or a part thereof, to generate the hash value. The client application 530 may invoke the hash generation module 530 of the client device 116 to generate a hash value based on the UDF code. The client application 530 stores the generated hash value. The hash generation module 530 of the UDF module 550 is invoked by the data processing service 102 to generate hash value based on the UDF code invoked when a database query is executed. The hash value generated by the client application 530 can be compared with the hash value generated by the data processing service 102 to make sure that the UDF code used for generating the UDF matches the UDF code used during execution of database queries.

An example of a hash function used by the hash generation module 530 is SHA-256, a cryptographic hash function that outputs a value that is 256 bits long. The hash value determined by the hash generation module 530 for a UDF code is also referred to as a hash digest. The hash generation module 530 may use a hash function and an encryption key to generate the hash value from the UDF code. According to an embodiment, the encryption key represents a secret key shared between the client application 510 and the data processing service 102. A distinct encryption key may be used for each UDF by the client application 510 and the data processing service 102.

The hash generation module 530 of the client device 116 generates a hash value using the UDF code specified as input to a UDF creation command and also generates a hash value using the UDF code executed by database queries and compares the two hash values to determine whether the UDF code specified as input to a UDF creation command matches the UDF code executed by database queries.

In general, there are two parties (or two systems) that generate the hash value, a source system, for example, a client application 520 generates the hash value using UDF code specified as input to the UDF creation command, and a target system, for example, the data processing service 102 or a database system that executes database queries that invoke the UDF code. The two systems may generate the hash values using symmetric encryption keys. The two systems may derive a symmetric encryption key using a DH (Diffie-Hellman key exchange) key-derivation using the KK handshake pattern.

The public keys of the data processing service 102 are known to the client application 510 in advance and can be independently verified. The public key of the client application 510 is known to the data processing service 102 in advance and is securely provided and verified. According to an embodiment, the hash value generated, represents HMAC (hash-based message authentication code) generated using derived symmetric keys. According to an embodiment, a session identifier generated for a session created by the client application 510 with the data processing service 102 may be used as a unique identifier that is mixed with the derived key to preserve forward secrecy.

The use of a derived symmetric key provides enhanced security compared to asymmetric keys based on public/private keys. The derived symmetric keys use additional metadata for deriving the keys. The metadata used for generating the derived symmetric keys may be an identifier of the user creating the UDF, an identifier representing an account in the data processing service 102 that the client device is connecting to, and so on. As a result, a different derived symmetric key may be generated for each UDF that is created. The mechanism disclosed herein provides for increased security compared to a system that uses the same public key/private key for all UDFs since a user that manages to get access to the private key can access all UDFs. In contrast, if a user can manage to get access to a derived symmetric key, that user only gets unauthorized to that specific UDF but does not manage to get access to other UDFs that use other derived symmetric keys. This limits the blast radius of an unauthorized access caused as a result of a security breach. Furthermore, providing separate private key/public key for each UDF is an expensive process compared to using derived symmetric keys. As a result, enhanced authentication is obtained in a computationally efficient manner. However, various embodiments may also use asymmetric keys, for example, a public key/private key pair for providing security for a set of UDFs.

The UDF code typically performs tasks that are simpler to express using programming languages different from the database query language. An example of a type of task performed using an UDF is execution of a trained machine learning model such as a neural network for predicting scores for certain artificial intelligence tasks while executing a database query. For example, one or more database tables may store values representing features input to the machine learning model (e.g., feature values) and a database query predicts certain values based on the score predicted by the machine learning model when provided the feature values as input. The hash value generated based on the UDF code is based on the parameters of the machine-learning model. Accordingly, the client application 510 may determine whether the machine learning model being executed by the data processing service 102 with a database query matches the machine learning model that was used for creating the UDF.

Process for Creation and Execution of UDFs

Figure 7:
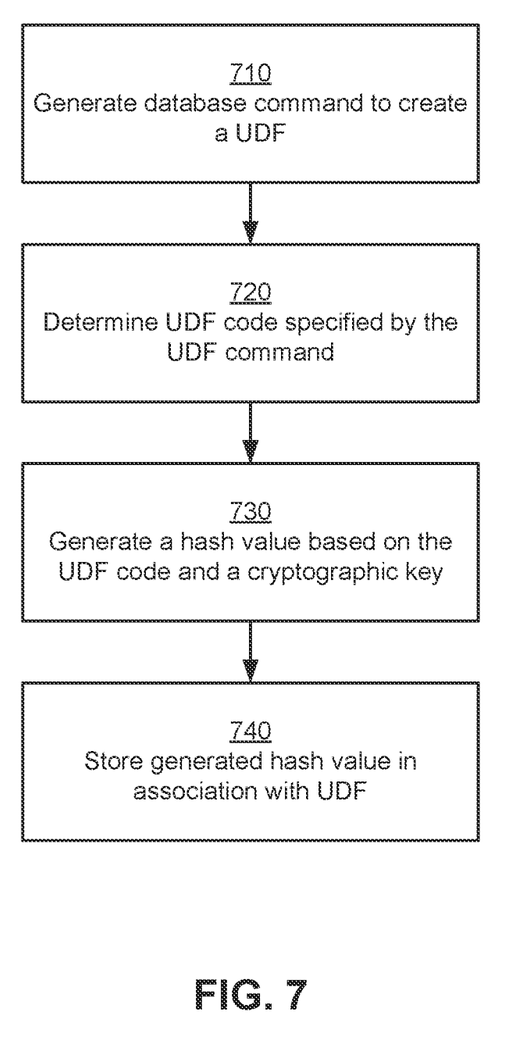
FIG. 7 shows a flowchart illustrating the process of creation of a UDF according to an embodiment.

FIG. 7 shows a flowchart illustrating the process of creation of a UDF according to an embodiment. The steps described herein are indicated as being executed by the client application 510 of the client device 116. However, the steps may be executed by any system, for example, the data processing service 102.

The client application 510 generates a database command for creating a UDF. The client application 510 sends the generated database command to the data processing service 102 for creating the UDF in a database system of the data processing service 102. The database command for creating the UDF specifies UDF code 520.

The client application 510 determines 720 the UDF code specified by the database command. The client application 510 generates a hash value H1 based on the UDF code. According to an embodiment, the client application 510 generates the hash value H1 based on the UDF code using a hash function F and an encryption key. The client application 510 stores the generated hash value in association with the UDF. The hash value H1 represents the UDF code that was specified for creating the UDF. The client application 510 uses the stored hash value H1 for comparing with a hash value generated by the data processing service 102 during execution of a database query that invokes the UDF code to determine whether the UDF code specified during creation of the UDF matches the UDF code being executed during execution of database queries.

Figure 8:
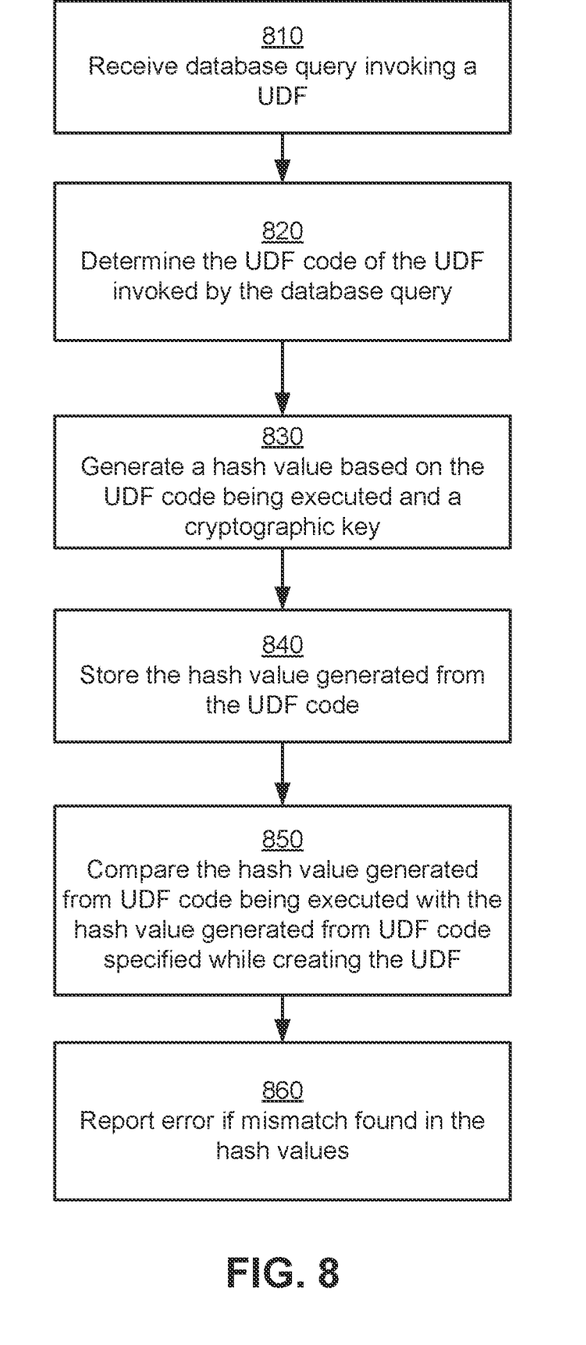
FIG. 8 shows a flowchart illustrating the process of executing a database query that invokes a UDF according to an embodiment.

FIG. 8 shows a flowchart illustrating the process of executing a database query that invokes a UDF according to an embodiment. The steps described herein are being executed by the query processing module 320 of the data processing service 102.

The query processing module 320 of the data processing service 102 receives 810 a database query invoking a UDF, for example, the UDF associated with the UDF code 540. The query processing module 320 determines 820 the UDF code 540 of the UDF invoked by the database query. According to an embodiment, the UDF code may be identified using markers within the UDF creation command.

The UDF module 550 of the query processing module 320 generates 830 a hash value H2 based on the UDF code 540 of the UDF invoked by the database query. According to an embodiment, the query processing module 320 generates the hash value H2 based on the UDF code 540 using a hash function F and an encryption key. The encryption key used for generating the hash value H2 matches the encryption key used for generating the hash value H1 using the UDF code used for creating the UDF. Accordingly, the client application 510 creating the UDF and the data processing service 102 executing the database query use symmetric keys for encoding their respective UDF codes.

The data processing service 102 stores 840 the hash value H2 generated using the UDF code 540. The hash value may be stored in a log, for example, audit logs used for storing information describing various database queries executed by the database system. The data processing service 102 stores the hash value in the audit log instead of the actual information stored in the UDF code thereby avoiding the possibility of making potentially sensitive information stored in the UDF code accessible to users of the database system.

According to an embodiment, the client application 510 compares 850 the hash value H2 representing the UDF code 540 executed using the UDF invoked by the database query with the hash value H1 representing the UDF code 520 specified for creating the UDF. The comparison may be performed by any system, for example, by the data processing service 102 or by a third system that is different from the client application 510 or the data processing service 102. The comparison may be performed by executing a script that processes logs storing information describing the database queries being executed.

If the hash values H1 and H2 fail to match, the client application 510 takes certain actions, for example, reporting 860 an error. The client application 510 may store the information indicating the mismatch in logs. The client application 510 may send (or transmit) an alert indicating the mismatch. For example, the client application 510 may provide the information for display in a visual dashboard configured to display possible issues with the execution of a database query. According to an embodiment, the client application 510 may disable subsequent executions of the same database query that invokes the UDF. The client application 510 may disable subsequent invocations of the UDF by any database query. The subsequent executions of a database query or invocations of the UDF may be disabled until the UDF is regenerated or replaced with a new UDF that uses the correct UDF code.

According to an embodiment, the client application and the data processing service 102 use a shared public key for validating the code. This allows the client application 510 to revoke the public key, thereby preventing the data processing service 102 from deriving the necessary keys to validate the UDF code. This allows the client application to prevent the data processing service 102 from executing the UDF code if necessary, thereby disabling the execution of the UDF code. Accordingly, client applications can disable individual UDFs by revoking the public keys used for authentication of execution of the UDF code. This provides a client application 510 with control over the execution of the database query even if the database query is executing in a separate environment, for example, on a cloud platform and the client application 510 does not have direct control over the execution of the database queries.

According to an embodiment, the query processing module 320 of the data processing service 102 receives requests to execute database queries, for example, from a client application 510. The query processing module 320 determines whether one or more database queries requested for execution invoke UDFs. The query processing module 320 identifies database queries being executed that invoke the UDFs. The query processing module 320 generates hash values for the UDFs being invoked based on the hash function and encryption keys. The query processing module 320 invokes a callback mechanism to send a request to the client application 510 that requested the execution. The request provides the identities of the UDFs being invoked and the corresponding hash values generated by the query processing module 320. The client application 510 matches the hash values of the UDF codes being executed (received from the data processing service 102) with hash keys of UDF codes specified with commands for generating the corresponding UDFs. If the client application 510 determines a mismatch, the client application 510 provides an error code to the callback request, thereby disabling the execution of the database queries by the query processing module 320 of the data processing service 102. If the client application 510 determines that there is no mismatch, the client application 510 provides a success code to the callback request, thereby allowing the execution of the database queries by the data processing service 102 to proceed.

UDF with Encoded UDF Code

According to an embodiment, the client application 510 encodes the UDF code specified using the command that creates the UDF. For example, the following command for creating a UDF specifies the UDF code as a base 64 encoded encrypted string.

```
CREATE OR REPLACE FUNCTION foo1(a STRING)
RETURNS INT
LANGUAGE PYTHON
AS $$<base64encoded encrypted string>$$
```

The data processing service 102 stores metadata describing the UDF in a catalog. Accordingly, the encoded UDF code is stored in the catalog as metadata. The data processing service 102 stores the UDF code in an encrypted form, thereby ensuring that users of the data processing service 102 do not get unauthorized access to the UDF code. The data processing service 102 decrypts the encoded UDF code using derived symmetric keys when the data processing service 102 executes the UDF, for example, as a result of invocation by database queries being executed by the data processing service 102. Accordingly, the UDF code is decrypted only when the query processing module 320 executes a database query that invokes the UDF code and is kept in an encoded form in the data processing service 102 otherwise. As a result, the data processing service 102 provides a guarantee to users that create and execute UDFs that any sensitive information that may be part of the UDF code is not accessed by other users.

Figure 9:
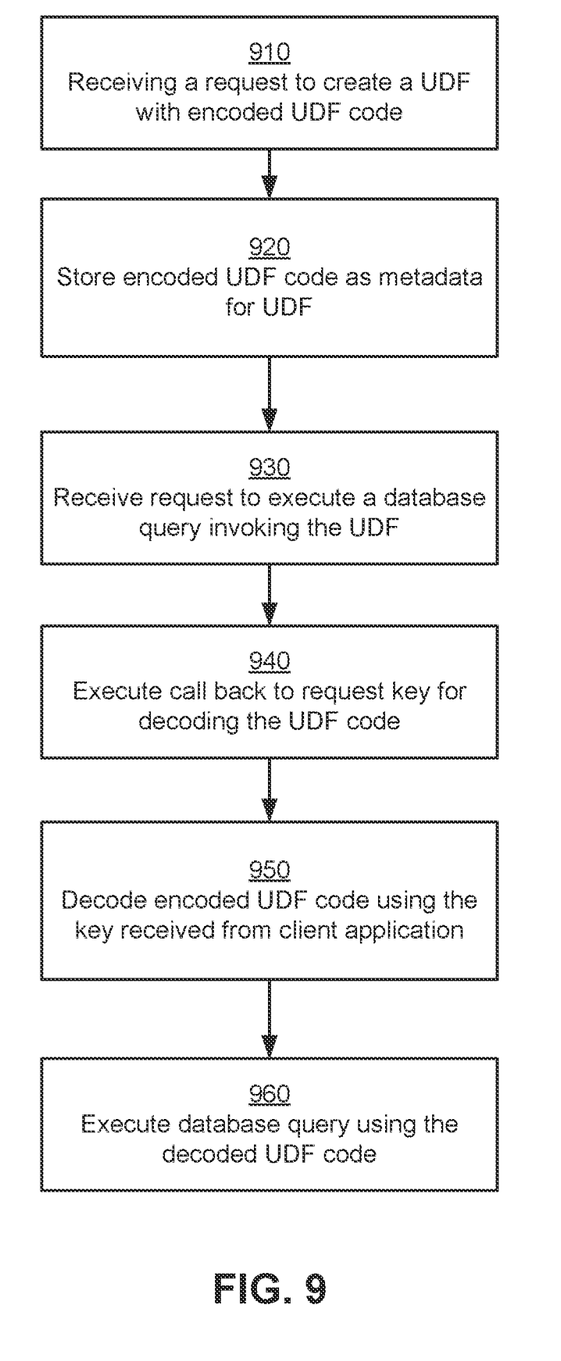
FIG. 9 shows a flowchart illustrating a process for executing a UDF specified as an encoded string according to an embodiment.

FIG. 9 shows a flowchart illustrating a process for executing a UDF specified as an encoded string according to an embodiment. The data processing service 102, receives 910 a request to create a UDF that specifies encoded UDF code. The data processing service 102 stores 920 the encoded UDF code as part of metadata describing the UDF that is created.

The data processing service 102 subsequently receives 930 a request to execute a database query invoking the UDF. The execution engine of the query processing module 320 executes 940 a call back function as part of execution of the database query. The call back function may be an API of the client application and requests a key for decoding the encoded UDF code. The key may be a cryptographic key. The query processing module 320 receives the key from the client application and uses the key to decode 950 the encoded UDF code. The query processing module 320 executes the database query using the decoded UDF code.

The query processing module 320 decodes the UDF code only while executing database queries thereby storing the UDF code in a secure fashion while the UDF code is not being executed. Accordingly, the data processing service 102 provides enhanced security of the UDF code provided by users when creating a UDF. Furthermore, this mechanism allows the client application to disable use of the UDF code by the data processing service 102 at any point in time by declining to provide the cryptographic key for decoding the encoded UDF code when the data processing service 102 executes the call back function requesting the key.

Compute® Architecture

Figure 10:
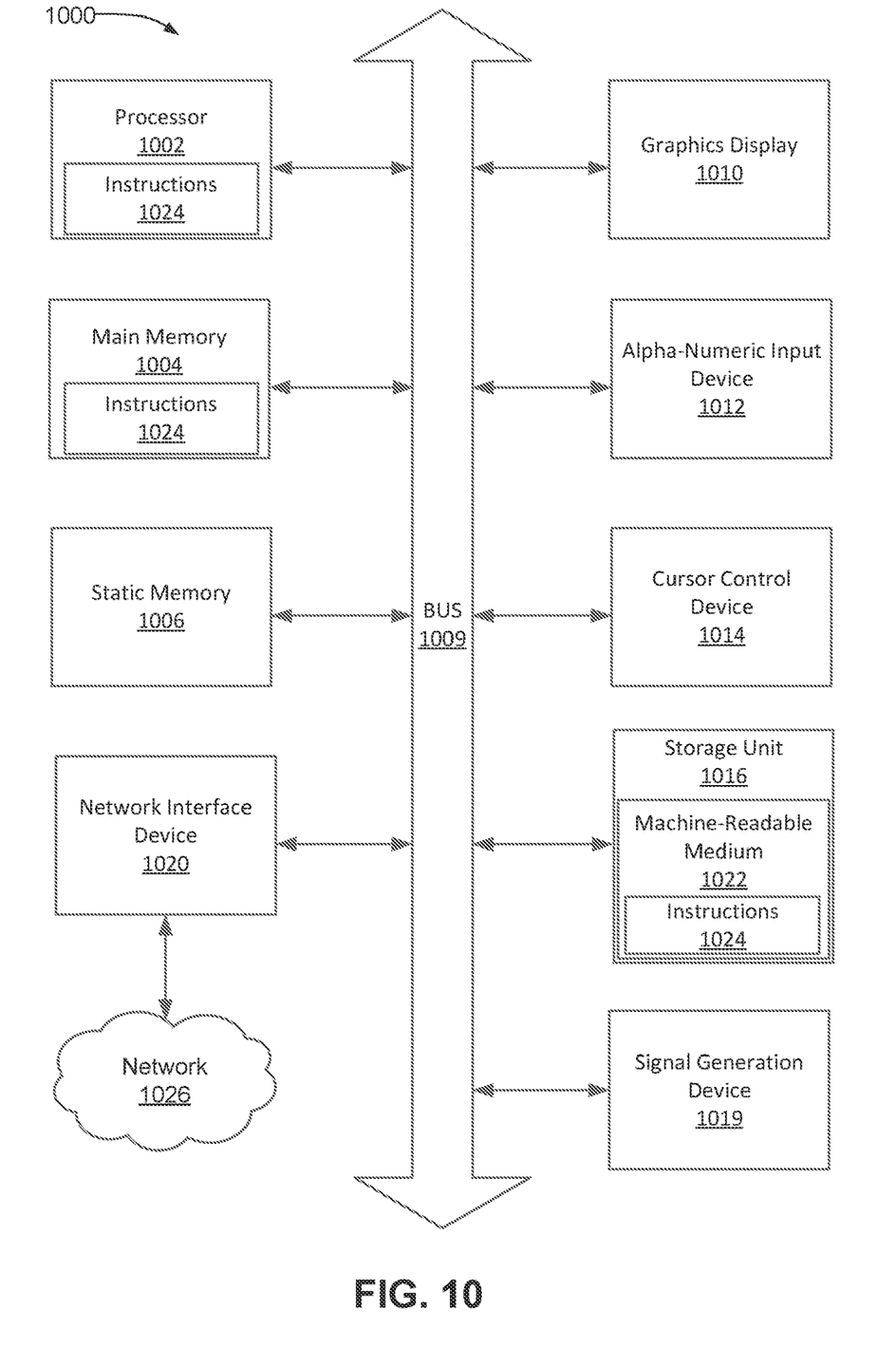
FIG. 10, illustrates an example machine to read and execute computer-readable instructions, in accordance with an embodiment.

Turning now to FIG. 10, illustrated is an example machine to read and execute computer readable instructions, in accordance with an embodiment. Specifically, FIG. 10 shows a diagrammatic representation of the data processing service 102 (and/or data processing system) in the example form of a computer system 1000. The computer system 1000 can be used to execute instructions 1024 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processing units (generally processor 1002). The processor 1002 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 1000. The computer system 1000 also includes a main memory 1004. The computer system may include a storage unit 1016. The processor 1002, memory 1004, and the storage unit 1016 communicate via a bus 1008.

In addition, the computer system 1000 can include a static memory 1006, a graphics display 1010 (e.g., to drive a plasma display panel (PDP), a liquid crystal display (LCD), or a projector). The computer system 1000 may also include alphanumeric input device 1012 (e.g., a keyboard), a cursor control device 1014 (e.g., a mouse, a trackball, a joystick, a motion sensor, or other pointing instrument), a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. For example, the instructions 1024 may include instructions for implementing the functionalities of the query processing module 320. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 may be transmitted or received over a network 1026, such as the network 120, via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for executing user defined functions in database systems, the computer-implemented method comprising:

receiving, by a database system, from a client application, a request to create a user defined function, the user defined function (UDF) comprising a first UDF code specified using a programing language distinct from a database query language, wherein the UDF is configured to be invoked using database queries specified using the database query language;

generating a first hash value based on the first UDF code, the first hash value generated using a hash function and an encryption key;

receiving, by a database system, a request to execute a database query that invokes the UDF;

determining a second UDF code executed during execution of the database query;

generating a second hash value based on the second UDF code executed during execution of the database query, the second hash value generated using the hash function and the encryption key;

sending, by the database system, a callback request to the client application, the callback request providing an identifier of the UDF and the second hash value;

receiving, by the database system, a result code from the client application in response to the callback request, wherein the client application returns an error code if there is a mismatch between the first hash value and the second hash value and a success code otherwise; and responsive to the database system receiving an error code, disabling execution of the database query.

2. The computer-implemented method of claim 1, wherein the encryption key represents a secret key shared between the client application and the database system.

3. The computer-implemented method of claim 1, wherein the UDF is a first UDF and the encryption key is a first encryption key, wherein a second encryption key is used for generating a hash value for a second UDF.

4. The computer-implemented method of claim 1, wherein the client application serializes the first UDF code and sends the serialized first UDF code to the database system.

5. The computer-implemented method of claim 1, wherein the first UDF code comprises a trained machine learning model configured to predict one or more values based on data stored in a database table.

6. The computer-implemented method of claim 1, wherein the second UDF code is represented as an encoded string, wherein executing the database query comprises:

executing a call back function to retrieve a key;

decoding the encoded string representing the second UDF code using the key to obtain a decoded UDF code; and executing the decoded UDF code.

7. The computer-implemented method of claim 1, further comprising:

blocking a subsequent execution of the database query invoking the UDF when the first UDF code specified upon generation of the user defined function fails to match the second UDF code executed upon execution of the database query invoking the user defined function.

8. The computer-implemented method of claim 1, wherein the database query is executed by a data processing service, wherein the client application and the data processing service share a public key used for decrypting the second UDF code, the computer-implemented method further comprising:

disabling execution of the second UDF code invoked by database queries by the client application by revoking access to the public key used by the data processing service for decrypting the second UDF code.

9. A non-transitory computer readable storage medium comprising stored instructions for executing user defined functions in database systems that when executed by one or more computer processors cause the one or more computer processors to:

receive, by a database system, from a client application, a request to create a user defined function (UDF) comprising a first UDF code specified using a programming language distinct from a database query language, the UDF is configured for invocation using database queries using the database query language;

generate a first hash value based on the first UDF code, the first hash value based on a hash function and an encryption key;

receive, by a database system, a request to execute a database query invoking the UDF;

determine a second UDF code executed during execution of the database query;

generate a second hash value based on the second UDF code executed during execution of the database query, the second hash value based on the hash function and the encryption key;

send, by the database system, a callback request to the client application, the callback request providing an identifier of the UDF and the second hash value;

receive, by the database system, a result code from the client application in response to the callback request, wherein the client application returns an error code if there is a mismatch between the first hash value and the second hash value and a success code otherwise; and responsive to the database system receiving an error code, disable execution of the database query.

10. The non-transitory computer readable storage medium of claim 9, wherein the encryption key represents a secret key shared between the client application and the database system.

11. The non-transitory computer readable storage medium of claim 9, wherein the UDF is a first UDF and the encryption key is a first encryption key, wherein a second encryption key is used for generating a hash value for a second UDF.

12. The non-transitory computer readable storage medium of claim 9, wherein the client application serializes the first UDF code and sends the serialized first UDF code to the database system.

13. The non-transitory computer readable storage medium of claim 9, wherein the first UDF code comprises a trained machine learning model configured to predict one or more values based on data stored in a database table.

14. The non-transitory computer readable storage medium of claim 9, wherein the UDF code is represented as an encoded string, wherein stored instructions that when executed by the one or more computer processors cause the one or more computer processors to execute the database query cause the one or more computer processors to:

execute a call back function to retrieve a key;

decode the encoded string representing the second UDF code using the key to obtain a decoded UDF code; and execute the decoded UDF code.

15. The non-transitory computer readable storage medium of claim 9, further comprising stored instructions that when executed by the one or more computer processors cause the one or more computer processors to:

block a subsequent execution of the database query invoking the UDF when the first UDF code specified upon generation of the user defined function fails to match the second UDF code executed upon execution of the database query invoking the user defined function.

16. The non-transitory computer readable storage medium of claim 9, wherein the database query is executed by a data processing service, wherein the client application and the data processing service share a public key used for decrypting the second UDF code, wherein the stored instructions when executed by the one or more computer processors cause the one or more computer processors to:

disabling execution of the second UDF code invoked by database queries by the client application by revoking access to the public key used by the data processing service for decrypting the second UDF code.

17. A computer system comprising:

a computer processor; and a non-transitory computer readable storage medium comprising stored instructions for executing user defined functions in database systems that when executed by one or more computer processors cause the one or more computer processors to:
  receive, by a database system, from a client application, a request to create a user defined function, the user defined function (UDF) comprising a first UDF code specified using a programing language distinct from a database query language, the UDF is configured for invocation using database queries using the database query language;
  generate a first hash value based on the first UDF code, the first hash value based on a hash function and an encryption key;
  receive, by a database system, a request to execute a database query invoking the UDF;
  determine a second UDF code executed during execution of the database query;
  generate a second hash value based on the second UDF code executed during execution of the database query, the second hash value based on the hash function and the encryption key;
  send, by the database system, a callback request to the client application, the callback request providing an identifier of the UDF and the second hash value;
  receive, by the database system, a result code from the client application in response to the callback request, wherein the client application returns an error code if there is a mismatch between the first hash value and the second hash value and a success code otherwise; and
  responsive to the database system receiving an error code, disable execution of the database query.

18. The computer system of claim 17, wherein the first UDF code comprises a trained machine learning model configured to predict one or more values based on data stored in a database table.

19. The computer system of claim 17, further comprising stored instructions that when executed by the one or more computer processors cause the one or more computer processors to:
  block a subsequent execution of the database query invoking the UDF when the first UDF code specified upon generation of the user defined function fails to match the second UDF code executed upon execution of the database query invoking the user defined function.

20. The computer system of claim 17, wherein the database query is executed by a data processing service, wherein the client application and the data processing service share a public key used for decrypting the second UDF code, wherein the stored instructions when executed by the one or more computer processors cause the one or more computer processors to:
  disabling execution of the second UDF code invoked by database queries by the client application by revoking access to the public key used by the data processing service for decrypting the second UDF code.

* * * * *